Patented May 26, 1936

2,041,851

UNITED STATES PATENT OFFICE 2,041,851

AZO DYESTUFFS AND THEIR PRODUCTION

Mordecai Mendoza, West Didsbury, England, assignor to Imperial Chemical Industries Limited, a corporation of Great Britain No Drawing. Application July 6, 1933, Serial No. 679,267. In Great Britain July 7, 1932

7 Claims. (Cl. 260—92)

The present invention relates to the manufacture of new azo, disazo and polyazo dyestuffs and uses as coupling components the condensation products which may be obtained by treating aminonaphthol sulphonic acids with a halohydrin in the presence of an acid binding agent. The hydroxy-alkylated aminonaphthol sulphonic acids thus obtained appear to be mixtures of mono and di-N-hydroxyalkylaminonaphthol sulphonic acids; they are non-diazotizable and capable of combining with diazotized or tetrazotized compounds in alkaline, acid or neutral solution. To the best of our knowledge they have not been used as components of azo dyestuffs.

N-hydroxyalkyl derivatives of the following aminonaphthol sulphonic acids are suitable for use according to the present invention. 1-amino-5-naphthol-7-sulphonic acid, 1-amino-8-naphthol-4-sulphonic acid, 2-amino-3-naphthol-6-sulphonic acid, 2-amino-5-naphthol-7-sulphonic acid, 2-amino-8-naphthol-6-sulphonic acid, 1-amino-8-naphthol-2,4-disulphonic acid, 1-amino-8-naphthol-3,5-disulphonic acid, 1-amino-8-naphthol-3,6-disulphonic acid, 1-amino-8-naphthol-4,6-disulphonic acid and 2-amino-8-naphthol-3,6-disulphonic acid.

These acids are treated with an alkyl chlorhydrin such as ethylenechlorhydrin, typically suitable conditions being given in Examples 1 to 3. The solutions obtained may be often advantageously used as such in the manufacture of azo dyestuffs. The products may however be separated in the solid state.

The azo dyestuffs obtained in accordance with the invention have varied properties dependent largely on the nature of the particular diazo or tetrazo compound employed in their preparation. Generally the shades obtained are brighter and tend more towards blue than the shades of the dyestuffs obtained by combining the same diazo or tetrazo compounds with the parent aminonaphthol-sulphonic acids. Valuable dyestuffs for wool, silk, regenerated cellulose, cotton and other fibres are obtained. Those dyes containing an orthohydroxy azo group are applicable by the various chrome dyeing methods or known methods of pre- or after-treatment by other metal salts, or they may be converted into metal compounds of divalent or polyvalent metals, for example copper or chromium.

The following Examples 1 to 3 illustrate the preparation of N-hydroxyalkyl aminonaphthol sulphonic acids, while Examples 4 to 12 illustrate but do not limit the invention, the parts being parts by weight.

Example 1

239 parts of 2-amino-8-naphthol-6-sulphonic acid are dissolved in 2000 parts of water with enough sodium carbonate to make the solution neutral to litmus. 160 parts of crystallized sodium acetate are added followed by 646 parts of a 33% aqueous solution of ethylene chlorohydrin. The mixture is stirred and gently boiled under a reflux condenser for about 18 hours. No primary aromatic amino grouping can then be detected. The solution is cooled and may be used forthwith for the preparation of azo dyestuffs.

When 1-amino-8-naphthol-4-sulphonic acid is treated in a similar manner the condensation product separates in part on cooling.

Example 2

341 parts of the monosodium salt of 1-amino-8-naphthol-3,6-disulphonic acid are dissolved in 2000 parts of water with enough sodium carbonate to make the reaction neutral. 160 parts of crystallized sodium acetate are added followed by 775 parts of ethylene chlorohydrin (as 33% aqueous solution). The mixture is boiled as in Example 1 for 15–20 hours. No primary aromatic amine can then be detected. The cooled solution may be used directly for the preparation of azo dyestuffs.

Example 3

239 parts of 2-amino-5-naphthol-7-sulphonic acid are dissolved in 2000 parts of water with enough sodium carbonate to give a neutral solution. 160 parts of chalk and 1030 parts of a 33% aqueous solution of ethylene chlorohydrin are added. The mixture is boiled as in Example 1 for 15–20 hours. An almost clear solution is obtained which no longer contains diazotizable material. 170 parts of calcined sodium carbonate are then added, the precipitated calcium carbonate filtered off, and the clear filtrate used directly for the production of azo dyestuffs.

Example 4

The diazo suspension obtained in the usual manner from 17.3 parts of sulphanilic acid is stirred at about 10° C. into the solution obtained as in Example 1 from 25 parts of 2-amino-8-naphthol-6-sulphonic acid and to which 20 parts of calcined sodium carbonate have been added. Coupling proceeds very rapidly with formation of a deep brown solution. When coupling is complete the dyestuff is salted out, filtered off, dried and ground. The new dyestuff is a dark brown powder. When dyed from an acid bath it gives level brown shades on wool fast to washing.

When diazotized metanilic acid is used instead of diazotized sulphanilic acid a dyestuff is obtained which yields redder shades of brown, and when diazotized aniline and diazotized naphthionic acid are used yellower and bluer shades respectively are obtained.

When the condensation product obtained as in Example 3 from 2-amino-5-naphthol-7-sulphonic acid is coupled with diazotized aniline or aniline-sulphonic acids dyes giving orange shades on wool are obtained, whereas when it is coupled with diazotized naphthionic acid the dyestuff obtained gives clear red shades.

The condensation products from 1-amino-8-naphthol-4-sulphonic acid and 1-amino-8-naphthol-3,6-disulphonic acid give with diazotized aniline and its sulphonic acids violet dyestuffs and with diazotized naphthionic acid blue dyestuffs.

Example 5

19.3 parts of aminoazo benzene are diazotized and added at 10° C. to the solution, obtained as in Example 2 from 36 parts of 1-amino-8-naphthol-3,6-disulphonic acid (monosodium salt), to which, after making neutral, 20 parts of calcined sodium carbonate have been added. When the coupling is complete the dyestuff is separated by adding common salt. Wool is dyed by it from an acid bath in slate blue shades. Using as coupling component the equivalent amount of the corresponding condensation product of Example 1, a dyestuff of good levelling capacity is obtained which on regenerated cellulose, such as viscose silk, gives brown shades.

Example 6

21.2 parts of 2,2'-tolidine are tetrazotized in the customary manner and the tetrazo solution is run into a solution, obtained as in Example 1 from 60 parts of 1-amino-8-naphthol-4-sulphonic acid, to which after neutralizing has been added 25 parts of calcined sodium carbonate. On completion of the coupling the dyestuff is salted out, filtered and dried. From an acid bath it dyes wool in violet shades of good fastness to milling.

Example 7

15.4 parts of 4-nitro-2-aminophenol are dissolved in 150 parts of water containing 7.5 parts of hydrochloric acid and the resulting solution is cooled to below 10° C. 3.6 parts of sodium nitrite in 20% aqueous solution are added. When diazotization is complete the diazo compound is filtered off. It is stirred into a solution obtained as in Example 2 from 36 parts of the monosodium salt of 1-amino-8-naphthol-3,6-disulphonic acid to which, after neutralizing, 40 parts of calcined sodium carbonate have been added. When coupling is complete the coupling solution is made mineral acid and the dyestuff is separated by adding common salt. When dyed on wool from an acid bath the new dyestuff gives navy blue shades which are changed to dark green on after-chroming. A similar shade is obtained when the dyestuff is applied by the metachrome process.

By using as coupling component the solution obtained as in Example 1 from 30 parts of 1-amino-8-naphthol-4-sulphonic acid the dyestuff obtained dyes wool directly in slightly redder shades of blue. The afterchromed and metachromed shades are somewhat deeper green. The dyestuff obtained using the condensation liquor from 25 parts of 2-amino-8-napthol-6-sulphonic acid gives an olive brown shade converted to black-brown on after chroming. A similar shade is produced when the dyestuff is applied by the metachrome process.

Example 8

45 parts of the dyestuff obtained as in Example 7 by coupling diazotized 4-nitro-2-aminophenol with the condensation product obtained from 1-amino-8-naphthol-4-sulphonic acid are dissolved in 400 parts of water and 12 parts of hydrated chromium fluoride are added. The mixture is gently boiled under a reflux condenser until no further color change takes place, i. e. for four to five hours. The cooled solution is made mineral acid by adding hydrochloric acid and the dyestuff is salted out. It dyes wool from an acid bath in greenish navy blue shades.

Example 9

53 parts of the dyestuff obtained as in Example 7 by coupling diazotized 4-nitro-2-aminophenol with the condensation product derived from 1-amino-8-naphthol-3,6-disulphonic acid are dissolved in 400 parts of water and the solution is mixed with 100 parts of a 25% aqueous solution of crystallized copper sulphate. The mixture is boiled under a reflux condenser for three to four hours. The formation of the copper complex is then complete. After filtering from a small amount of insoluble matter the clear filtrate is cooled and the dyestuff is separated by making mineral acid and adding common salt. It dyes wool in dark blue shades from an acid bath.

Example 10

44 parts of the dyestuff obtained by coupling diazotized 4-chloro-2-aminophenol with the condensation product obtained from 30 parts of 1-amino-8-naphthol-4-sulphonic acid as described in Example 1 are dissolved in 400 parts of water containing 25 parts of crystallized copper sulphate. The mixture is made alkaline with ammonia and then boiled under a reflux condenser until no further color change takes place. After cooling, the solution is made mineral acid and the metallic complex is separated by addition of common salt. From an acid bath it dyes wool in navy blue shades.

Example 11

45 parts of the dyestuff obtained as in Example 7 by coupling diazotized 4-nitro-2-aminophenol with the condensation product obtained from 1-amino-8-naphthol-4-sulphonic acid are dissolved in 400 parts of water and the solution is mixed with 100 parts of a 25% aqueous solution of crystallized copper sulphate. The mixture is boiled under a reflux condenser from three to four hours when the formation of the copper derivative is complete. After filtering from a little insoluble matter the filtrate is cooled and the dyestuff is separated by adding common salt after making mineral acid. The new dyestuff dyes wool from an acid bath in blue shades of very good fastness to alkaline washing liquor.

Example 12

The diazo suspension obtained in the customary manner from 19.9 parts of picramic acid is coupled in alkaline medium to a solution obtained as in Example 1 from 25 parts of 2-amino-8-naphthol-6-sulphonic acid. When coupling is complete the dyestuff is isolated by salting out.

When applied to wool by the metachrome process brown shades are obtained and the dyebath exhausts well.

I claim:

1. Process for the manufacture of azo dyes comprising the coupling of an aminonaphtholsulphonic acid in which the amino group is substituted by at least one monohydroxyalkyl group but no other substituents, with an o-hydroxydiazo compound.

2. Azo dyes having the general formula

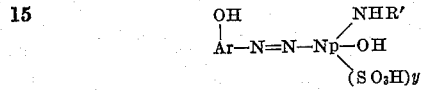

wherein Ar stands for an aromatic radical of the benzene series in which the group OH is located ortho to the group —N=N—, Np stands for a naphthalene residue, R' stands for a monohydroxy-alkyl radical, and $y$ represents the numeral 1 or 2; the said dyes being capable of dyeing wool from an acid bath.

3. Process for the manufacture of azo dyes which comprises coupling an o-hydroxydiazo compound with an N-hydroxyethylated aminonaphtholsulphonic acid containing no other substituents in the amino group.

4. Process for the manufacture of azo dyes which comprises reacting 2-amino-8-naphthol-6-sulfonic acid with about an equal weight of ethylene chlorohydrin in the presence of alkali, and coupling the product, without isolation, with an o-hydroxy-diazo compound.

5. The azo dye having in the form of its free acid, the formula:

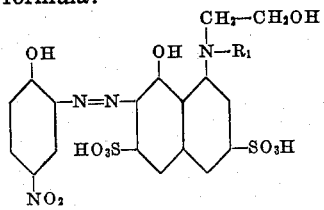

in which R' stands for hydrogen or hydroxyethyl.

6. Azo dyes having the general formula

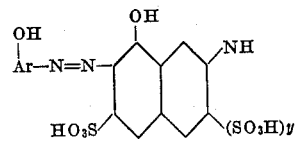

wherein Ar stands for an aromatic radical of the benzene series in which the group OH is located ortho to the group —N=N—, and $y$ stands for the numeral 0 or 1; the said dyes being acid soluble powders dyeing wool from an acid bath and being further capable of after chroming.

7. An azo dyestuff corresponding, in the form of its free acid, to the formula

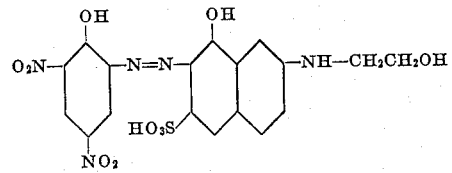

said dyestuff dyeing wool by the metachrome process to a brown shade.

MORDECAI MENDOZA.

Certificate of Correction

Patent No. 2,041,851.                                                                 May 26, 1936.

MORDECAI MENDOZA

It is hereby certified that error appears in the printed specification of the above numbered patent requiring correction as follows: Page 2, first column, line 2, strike out the words "on wool" and insert the same after "dyed" in line 1; page 3, second column, line 4, claim 5, in the formula, for "$R_1$" read $R'$; and lines 13 to 19 inclusive, claim 6, strike out the formula and insert the following:

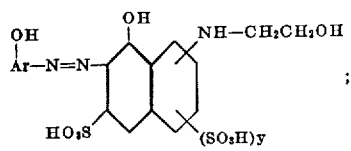

and that the said Letters Patent should be read with these corrections therein that the same may conform to the record of the case in the Patent Office.

Signed and sealed this 11th day of August, A. D. 1936.

[SEAL]

HENRY VAN ARSDALE,
*Acting Commissioner of Patents.*